US008248251B2

(12) United States Patent
Chen et al.

(10) Patent No.: US 8,248,251 B2

(45) Date of Patent: Aug. 21, 2012

(54) PERSONAL WATER SAFETY DEVICE

(75) Inventors: Chien-Lin Chen, Taipei Hsien (TW); Pi-Jye Tsaur, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 338 days.

(21) Appl. No.: 12/650,573

(22) Filed: Dec. 31, 2009

(65) Prior Publication Data

US 2011/0068933 A1 Mar. 24, 2011

(30) Foreign Application Priority Data

Sep. 24, 2009 (CN) .......................... 2009 1 0307669

(51) Int. Cl.

*G08B 23/00* (2006.01)
*G08B 21/00* (2006.01)
*G01S 3/80* (2006.01)

(52) U.S. Cl. ..................... 340/573.6; 340/529; 340/604; 367/124

(58) Field of Classification Search ................ 340/573.6
See application file for complete search history.

(56) References Cited

U.S. PATENT DOCUMENTS

| | | | | | |
|---|---|---|---|---|---|
| 4,776,045 | A | * | 10/1988 | Mysliwiec et al. | 2/426 |
| 4,961,339 | A | * | 10/1990 | Kleis et al. | 73/73 |
| 5,408,222 | A | * | 4/1995 | Yaffe et al. | 340/604 |
| 6,157,303 | A | * | 12/2000 | Bodie et al. | 340/573.6 |
| RE38,475 | E | * | 3/2004 | Marshall | 441/89 |
| 7,068,175 | B1 | * | 6/2006 | Pennington | 340/623 |
| 2009/0027211 | A1 | * | 1/2009 | Cutler et al. | 340/573.6 |
| 2011/0187538 | A1 | * | 8/2011 | Hawkins | 340/573.6 |

* cited by examiner

*Primary Examiner* — Daniel Wu
*Assistant Examiner* — Emily C Terrell
(74) *Attorney, Agent, or Firm* — Altis Law Group, Inc.

(57) ABSTRACT

A personal water safety device includes a barrel portion, and a base part. The base part connects two portions of a swimming goggle frame. The barrel portion includes a button, and a cylinder connected to the button via a spring. The base part includes a timer connected to the cylinder, and an alarm electrically connected to the timer. Water enters the cylinder when the button is pressed, and the timer measures an elapsed time when electrical conductivity of interior of the cylinder is in a predetermined range. The alarm generates an alarm when the measured time exceeds a predetermined time limit.

8 Claims, 4 Drawing Sheets

PERSONAL WATER SAFETY DEVICE

BACKGROUND

1. Technical Field

Embodiments of the present disclosure generally relate to safety devices, and more particularly to a personal water safety device.

2. Description of Related Art

Currently, if a swimmer is submerged for too long, there is no way for people nearby to know this unless they are watching at the time.

Therefore, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
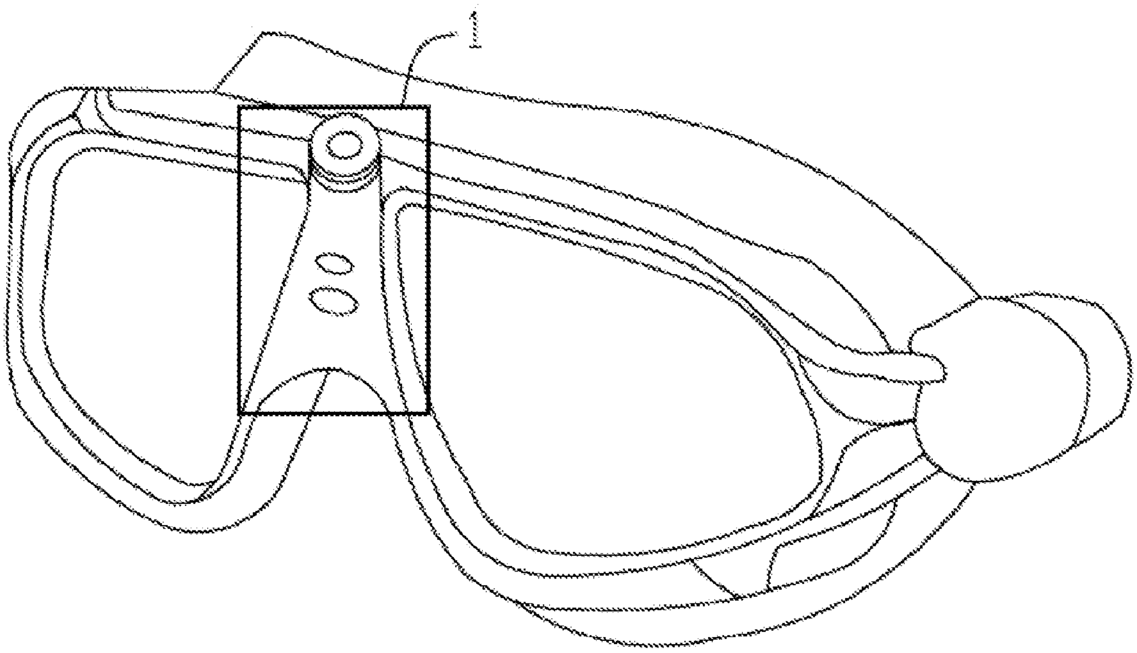
FIG. 1 is a schematic diagram of a pair of swimming goggles including a safety device.

FIG. 1 is a schematic diagram of a pair of swimming goggles including a safety device 1. In the exemplary embodiment, the safety device 1 is between two portions of the goggle frame. The safety device 1 acts as an alarm should a swimmer wearing it have trouble in the water. The safety device 1 is installed in the goggles as an example for the embodiment and may be installed elsewhere about the swimmer in other embodiments, such as in other articles of swimwear or swim equipment.

Figure 2:
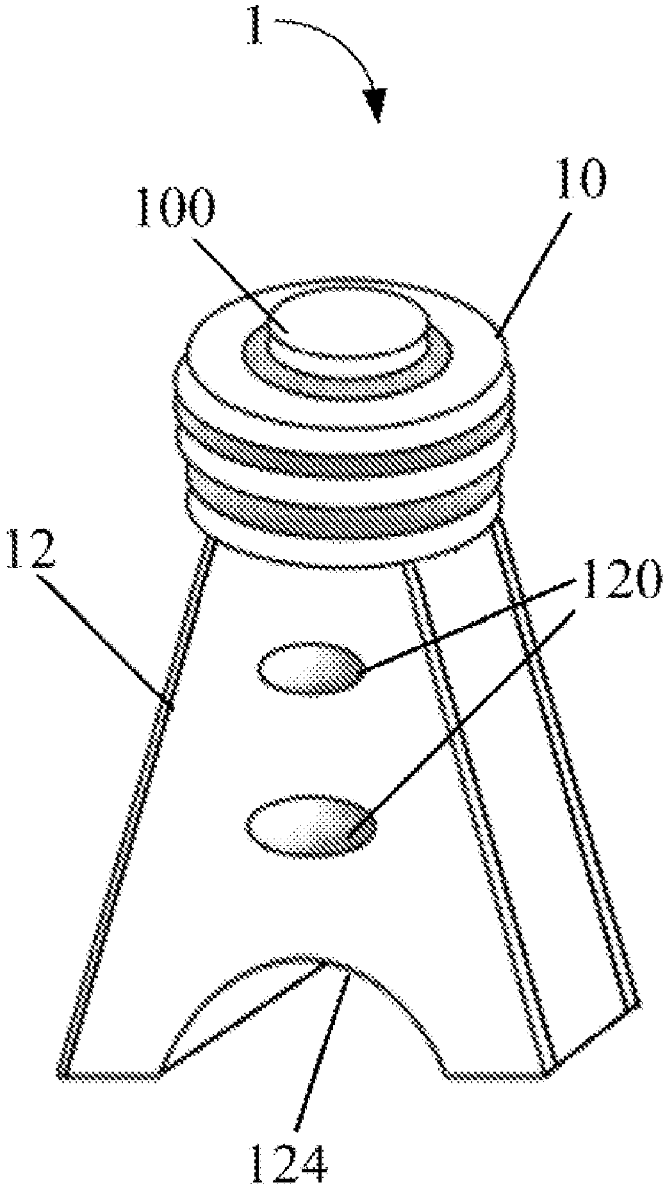
FIG. 2 is an enlarged view of the safety device of FIG. 1.
Figure 4:
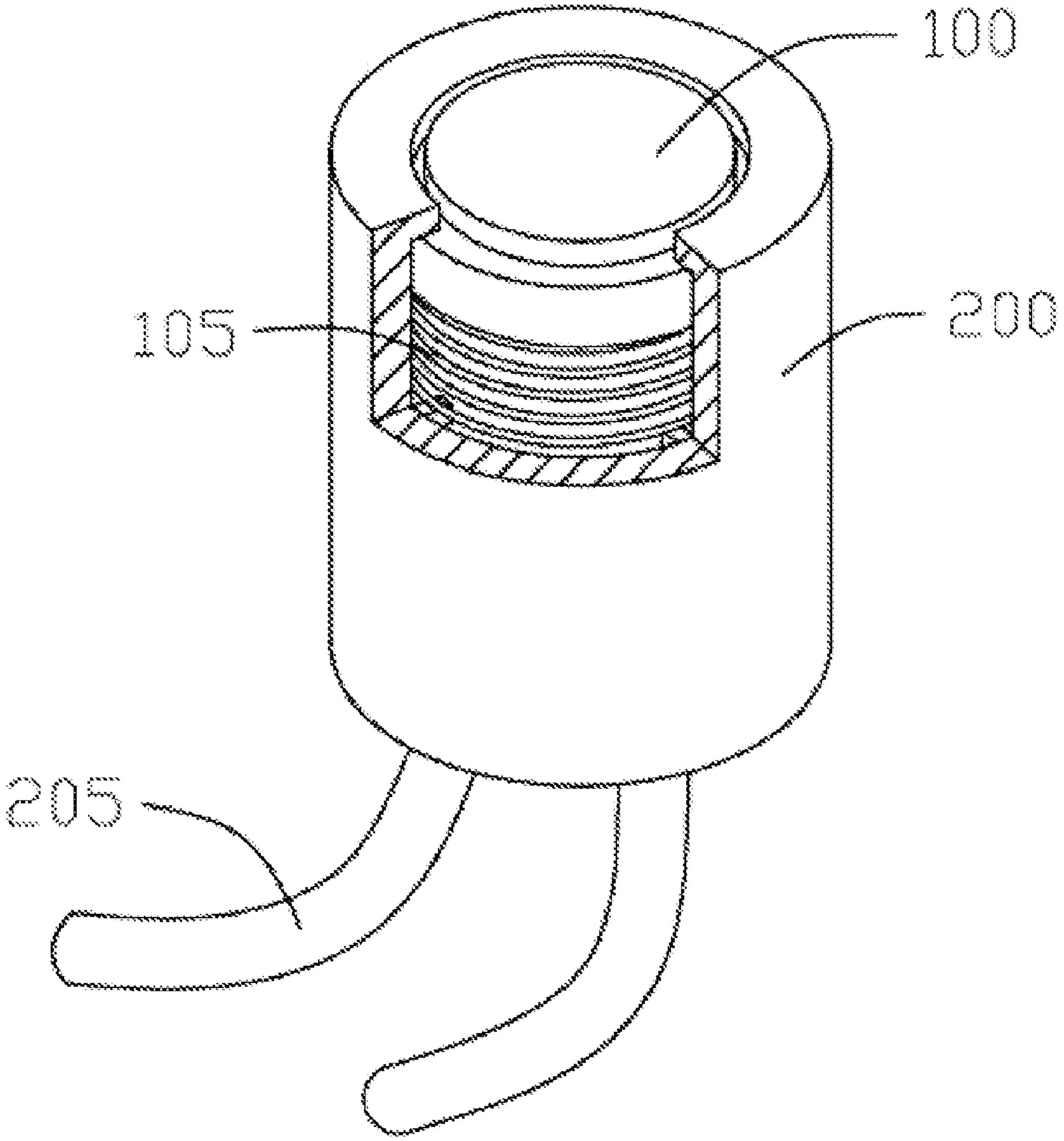
FIG. 4 is an isometric view of a cylinder of FIG. 3 with water in it.

FIG. 2 is an enlarged view of the safety device 1. The safety device 1 typically includes a barrel portion 10, and a base part 12 connected to the barrel portion 10. In the embodiment, the barrel portion 10 may be a cylinder. The barrel portion 10 includes a button 100, and a cylinder 200 connected to the button 100 via a spring 105 (see in FIG. 4). The button 100 protrudes out a head portion of the barrel portion 10, and the button 100 is narrower than the barrel portion 10. The base part 12 has a cutout in a bottom surface 124 thereof to accommodate a bridge of the nose of a swimmer. In the embodiment, an upper end of the base part 12 is narrower than a bottom end of the base part 12. The base part 12 further includes one or more holes 120 (two holes are shown in FIG. 2 and FIG. 4) that are connected to the cylinder 200 via one or more pipes 205 (see in FIG. 4).

Figure 3:
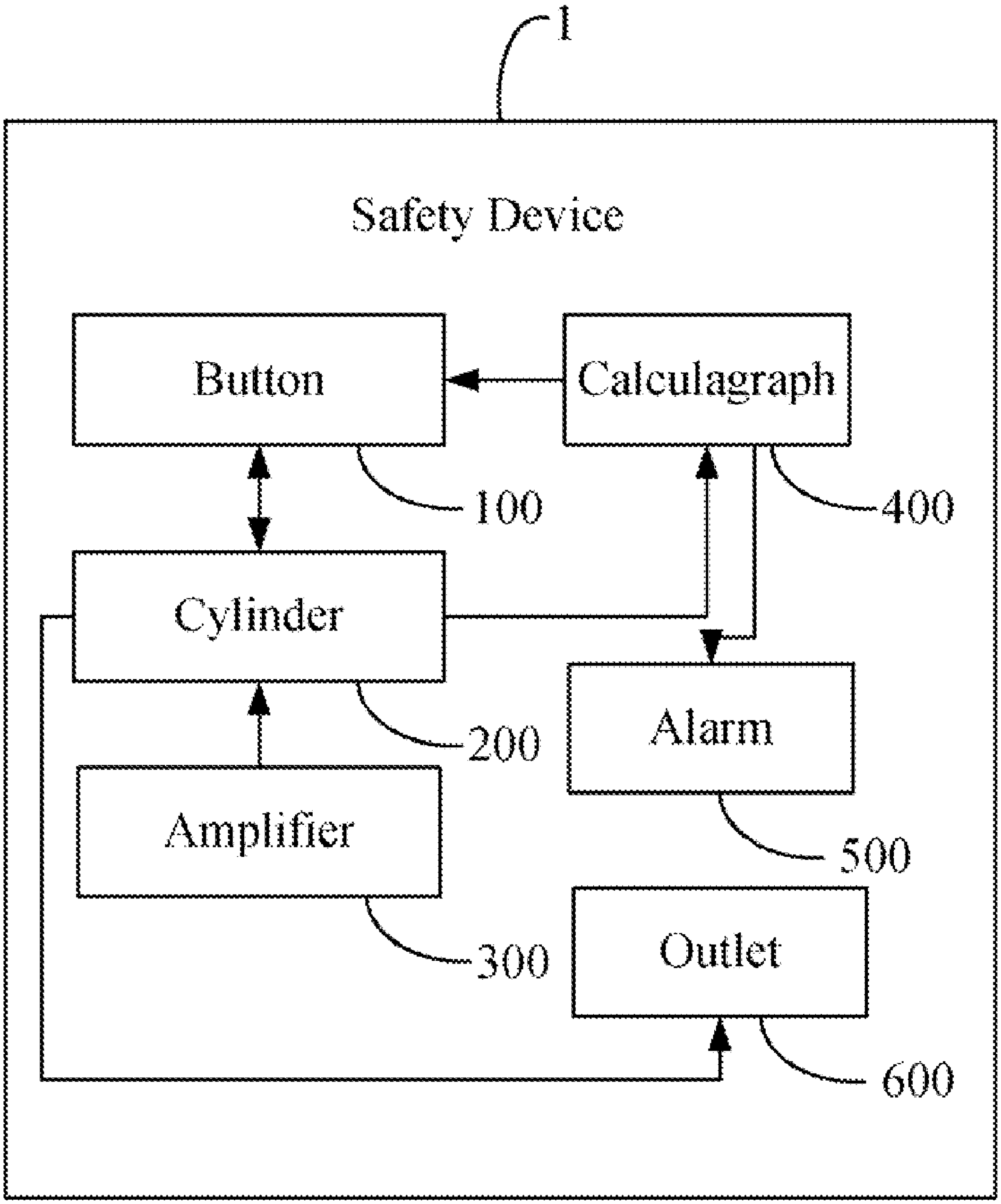
FIG. 3 is a block diagram of an exemplary embodiment of the safety device of FIG. 1.

FIG. 3 is a block diagram of an exemplary embodiment of the safety device 1. The safety device 1 further includes an amplifier 300, a timer 400, and an alarm 500, which are installed in the base part 12. The amplifier 300 is connected to the timer 400. The timer 400 is connected to the cylinder 200 and the button 100. The alarm 500 is electrically connected to the timer 400.

In the embodiment, the cylinder 200 is a conducting cylinder that can detect the electrical conductivity of the interior of the cylinder 200, and determine when water has filled the barrel portion 10 thus recognizing whether the safety device 1 (namely the swimmer) is under water. To accurately measure what may be a relatively small difference in the electrical conductivity of the cylinder 200 be it with air or water, the amplifier 300 is capable of amplifying the measured electrical conductivity. When the electrical conductivity is within a predetermined range the timer 400 is activated.

If water pressure activates the button 100 or if it is manually pressed by a swimmer, water can enter the cylinder 200 under ambient pressure through inlets exposed when the button 100 is depressed. As illustrated in FIG. 4, the inlets are gaps between the button 100 and the barrel portion 10. The timer 400 measures an elapsed time when electrical conductivity of the interior of the cylinder 200 is in the predetermined range. Timing stops if the electrical conductivity moves back out of the predetermined range, for example, the timing stops when the safety device 1 is out of water. If the measured time exceeds a predetermined time limit (e.g., 30 seconds), the alarm 500 generates an alarm (such as a piercing whistle) to alert anyone in the vicinity of an emergency. In the embodiment, the time limit can be set by the swimmer Note, the alarm 500 can be configured to include any alarm apparatus that can be seen or heard above the water even though the alarm 500 is submerged. For example, flashing light may be used, or some dye expelled by the alarm 500. In other embodiments, the alarm 500 may use wireless technology such as BLUETOOTH to communicate with a device left above water that can be more easily seen or heard.

In another embodiment, the cylinder 200 includes one or more outlets (not shown) that are connected to the holes 120 via the one or more pipes 205. If the safety device 1 is out of the water, any water in the cylinder 200 drains out through the one or more pipes 205.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A personal water safety device, comprising:

a barrel portion, comprising:

a button installed in the barrel portion comprising a head portion, the button protruding out of the head portion; and a cylinder connected to the button, the cylinder formed such that water enters the cylinder in response to the button being pressed, and the cylinder being a conducting cylinder that determines when water has filled the barrel portion, wherein the button is narrower than the barrel portion, and water enters the cylinder through a gap between the button and the barrel portion; and a base part connected to the barrel portion, the base part comprising:

a cutout being in a bottom surface, to accommodate the bridge of the nose of a swimmer;

a timer connected to the cylinder, to measure an elapsed time when electrical conductivity of interior of the cylinder is in a predetermined range; and an alarm electrically connected to the timer, to generate an alarm upon a condition that the measured time exceeds a predetermined time limit.

2. The safety device as claimed in claim 1, wherein the cylinder is a conducting cylinder that recognizes whether the safety device is under water by detecting the electrical conductivity of the interior of the cylinder.

3. The safety device as claimed in claim 2, further comprising an amplifier that amplifies the measured electrical conductivity of the interior of the cylinder.

4. The safety device as claimed in claim 1, wherein either the barrel portion or the button is a cylinder.

5. A personal water safety device, comprising:

a barrel portion, comprising:

a button installed in the barrel portion comprising a head portion, the button protruding out of the head portion; and a cylinder connected to the button, the cylinder formed such that water enters the cylinder in response to the button being pressed, and the cylinder being a conducting cylinder that determines when water has filled the barrel portion, wherein the button is narrower than the barrel portion, and water enters the cylinder through a gap between the button and the barrel portion; and a base part connecting two portions of a swimming goggle frame, the base part comprising:

a cutout being in a bottom surface, to accommodate the bridge of the nose of a swimmer;

a timer connected to the cylinder, to measure an elapsed time when electrical conductivity of interior of the cylinder is in a predetermined range; and an alarm electrically connected to the timer, to generate an alarm upon a condition that the measured time exceeds a predetermined time limit.

6. The safety device as claimed in claim 5, wherein the cylinder is a conducting cylinder that recognizes whether the safety device is under water by detecting the electrical conductivity of the interior of the cylinder.

7. The safety device as claimed in claim 6, further comprising an amplifier that amplifies the measured electrical conductivity of the interior of the cylinder.

8. The safety device as claimed in claim 5, wherein either the barrel portion or the button is a cylinder.

* * * * *